Dec. 4, 1945.   F. B. ARPS   2,390,040
DUMP SCOOP ATTACHMENT FOR TRACTORS
Filed Oct. 27, 1944   2 Sheets-Sheet 1

INVENTOR.
FREDERICK B. ARPS
BY   a.S.Krob
ATTORNEY

Dec. 4, 1945.    F. B. ARPS    2,390,040
DUMP SCOOP ATTACHMENT FOR TRACTORS
Filed Oct. 27, 1944    2 Sheets-Sheet 2

INVENTOR.
FREDERICK B. ARPS
BY
ATTORNEY

Patented Dec. 4, 1945

2,390,040

UNITED STATES PATENT OFFICE 2,390,040

DUMP SCOOP ATTACHMENT FOR TRACTORS

Frederick B. Arps, New Holstein, Wis., assignor to Arps Corporation, New Holstein, Wis., a corporation of Wisconsin Application October 27, 1944, Serial No. 560,653

5 Claims. (Cl. 37—126)

The present invention relates to a dump scoop attachment for tractors, the tractor having preferably a hydraulic lift with which to raise and lower the scoop.

The principal objects of the present invention are to provide a scoop which can be quickly attached and detached to the tractor, which is simple and easy to operate, durable and can be manufactured at low cost.

An object of my invention is to provide a scoop wherein the front end or cutting edge of the scoop is first lifted so as to break loose the soil or sod before the major weight of the scoop and its load is lifted, and wherein the scoop is tilted back sufficiently to prevent any of the material from falling forward and out of the scoop while being lifted and transported.

Another object of the present invention is to provide a latch for maintaining the loading and lifting positions of the scoop which may be broken manually for dumping the scoop.

A further object of the present invention is to provide means whereby the scoop will, at the proper time, automatically return to its loading position and will be automatically locked in this position until the beginning of the lifting operation.

To these and other useful ends, my invention consists of parts, combinations of parts or their equivalents and mode of operation as hereinafter described and claimed and shown in the accompanying drawings in which:

Figure 1:
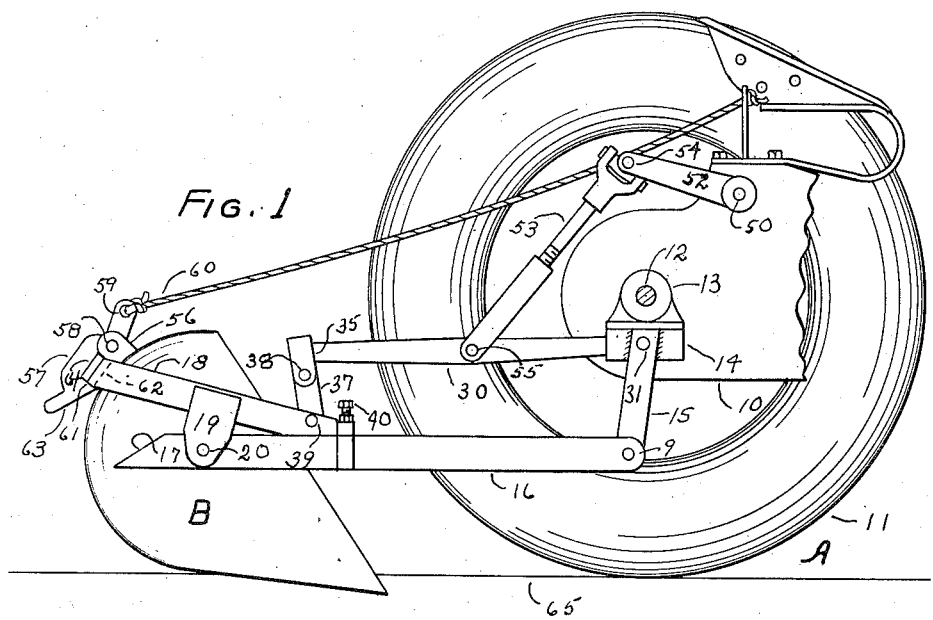
Fig. 1 is a side elevational view of my improved scoop in position for loading and shown attached to a conventional tractor, a fraction only of the tractor being shown.

As thus illustrated, a fraction only of the tractor is shown and is designated by reference character A. The body of the scoop is designated by reference character B. Numeral 10 designates the frame of the tractor and 11 designates the rear wheels of the tractor which are mounted on axles 12, the axles extending to the differential of the tractor and are rotatably mounted within axle housings 13—13.

Figure 5:
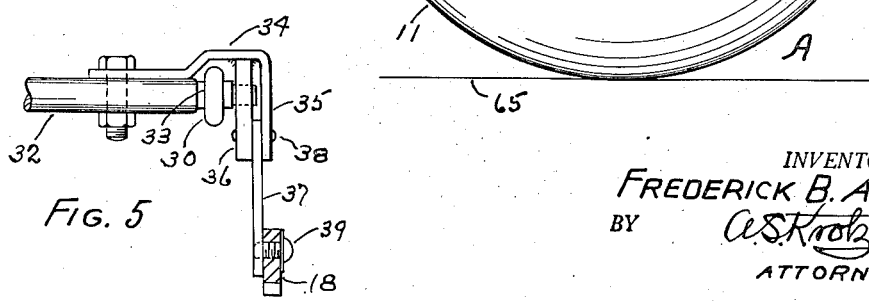
Fig. 5 is a fractional view of the device taken from line 5—5 of Fig. 4.

On each axle housing, I provide drawbar brackets 14—14, having depending arms 15—15 rigidly mounted thereon, to the lower ends of which are hingedly mounted drawbars 16—16 as at 9, the rear ends of which are formed on an angle as at 17, forming rests for the side members of a U shaped bracket 18. This bracket has depending members 19—19 and members 16 and 19 are pivoted to the side walls of member B as at 20—20. Supplemental bars 30—30 are pivoted at their front ends to brackets 14 as at 31. The rear ends of members 30 are pivotally mounted to a cross member 32 as at 33, the cross member having a bracket 34 which is supplied with depending members 35—35 and members 36 which are spaced from members 35 as illustrated in Fig. 5. Links 37 are positioned between members 35 and 36 and are pivoted thereto as at 38. The lower ends of links 37 are pivoted to the front ends of member 18 as at 39. On the front ends of the side bars of member 18, I screw thread bolts 40—40, the object of which is, when desired, to limit the down movement of the front ends of member 18, relative to members 16 for a purpose which will hereinafter appear.

A hydraulic lift (not shown) is positioned within tractor frame 10 having a shaft 50 which protrudes from tractor frame brackets 51—51. I rigidly mount levers 52—52 to shaft 50 as shown. At the rear ends of levers 52, I pivotally connect links 53—53 as at 54, the lower ends of links 53 being pivotally connected to arms 30 as at 55—55. It will be seen that when the free ends of levers 52 are in the scoop's loading position as shown in Fig. 1, members 16 and member 18 will be in the position shown in this figure. Scoop B is provided with a bracket 56, having a dog 57 which is pivoted to this bracket as at 58. An upwardly extending arm 59 is provided to which a pull rope 60 is secured, the lower end of member 57 having a hook 61 which engages the cross member 62 of the U shaped member 18. A guide way 63 forms means on member 57 for riding over member 62 when the scoop moves to its loading position as shown in Figure 1.

Thus scoop B will be held in the loading position by member 57 because of the fact that the front ends of the side members of member 18 rest on drawbar 16 or bolt 40 rests on the drawbars. When it is desired to lift the scoop, the hydraulic mechanism is operated, causing the front ends of the side members of member 18 to lift to the position shown in Fig. 2, the movement being limited by surfaces 17 on members 16, thus to tilt the scoop back to the position shown in this figure for a purpose which will hereinafter appear.

Figure 3:
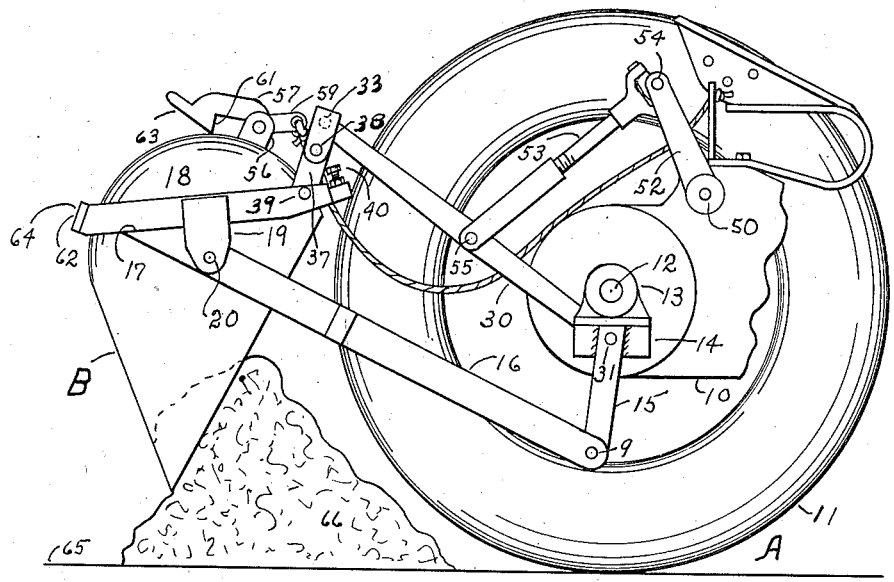
Fig. 3 is a view similar to Figure 2 after the scoop has been dumped.
Figure 4:
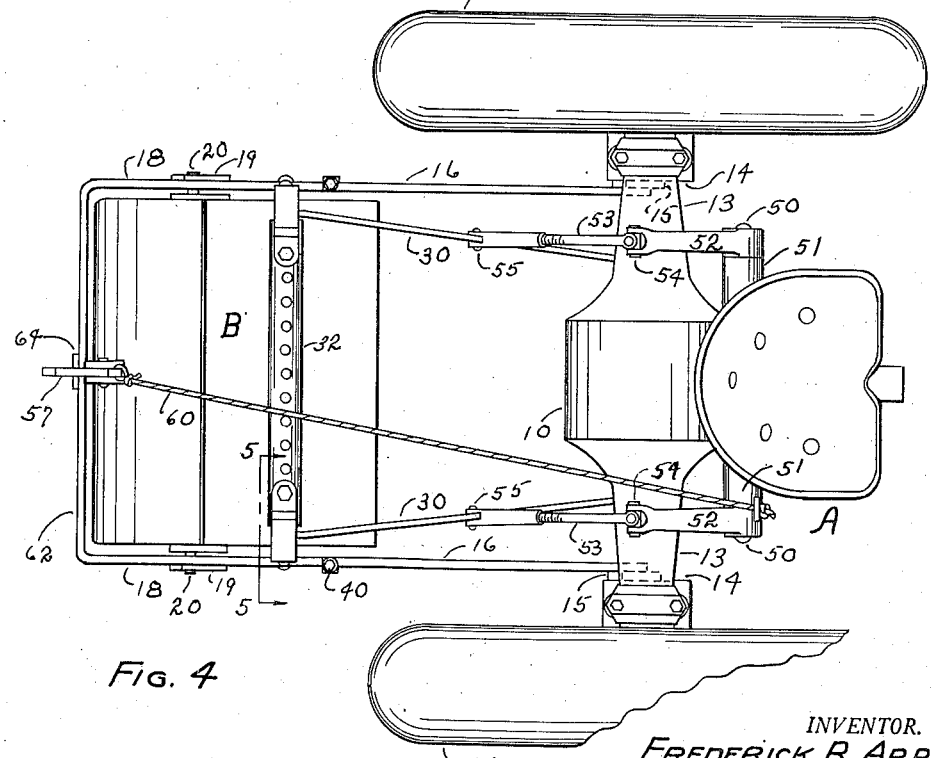
Fig. 4 is a top view of the scoop in the position shown in Fig. 1.

When it is desired to dump the scoop, rope 60 is pulled so as to disengage member 62 and its wearing block 64, permitting the scoop to assume the position shown in Fig. 3. In this figure, 65 represents the ground level and 66 represents the dirt after sliding from scoop B. When scoop B is in the raised position (shown in Fig. 3) and the tractor is moved forward, the dirt will be leveled to some extent, the leveling of the dirt depending on the height of scoop B. Thus the operator has control over the leveling of the dirt after it is dumped.

It will be understood that when scoop B is dumped, member 59 will contact member 32 so as to limit the tilted movement and permit leveling of the dirt as described. An advantage of this design is that when the scoop reaches its maximum tilted position, the contact between these members will cause all of the dirt to be loosened.

It will be seen that bolt 40 may be used to control the down suck of scoop B and that in the primary lifting operation the front edge of the scoop will be first lifted so as to break the sod or dirt loose, before it is necessary to lift scoop B from the ground, thus relieving the lifting mechanism from performing these operations simultaneously.

Figure 2:
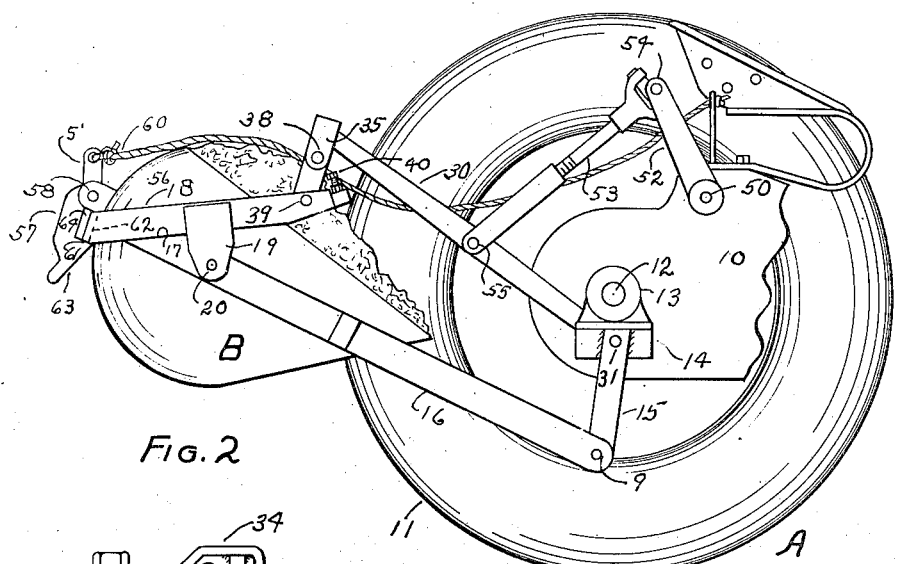
Fig. 2 is a view similar to Fig. 1 except with the scoop in a raised position and before being dumped.

It will be seen that when the scoop is tilted back as in Fig. 2, it will retain more of the dirt than if it was not tilted back.

Thus it will be understood that a maximum load may be retained on the scoop and lifted by the lifting mechanism and that the operator is given complete control over the moving of the scoop during the loading, lifting and dumping operations and that the operator has complete control over the disposition of the earth after it has been dumped.

Clearly many minor detail changes may be made in my design as shown, without departing from the spirit and scope of my invention as recited in the appended claims.

Having thus shown and described my invention, I claim:

1. In combination with a tractor, having a power lift, a scoop body, drawbars pivotally connected to the tractor at their front ends and to the side walls of the scoop at their rear ends, a U shaped member paralleling the sides and rear of the scoop, its side members being pivoted intermediate their ends to said scoop pivot to permit limited tilting in either direction of said U shaped member on its pivots, a latch on the rear of said scoop body, having means whereby when the scoop is moved to its loading position said latch will engage the rear end of said U shaped member, arms spaced above said drawbars and being hinged at their front ends to the tractor and having a link connection from their rear ends to the forward ends of said U shaped member, an operating connection from said power lift to said arms intermediate their ends, whereby when said power lifting mechanism is first operated the front end only of the scoop will be lifted and the scoop tilted somewhat backwards, means associated with said latch whereby when the scoop is lifted the tractor operator may release said latch and permit or force the scoop to tilt forward.

2. A device as recited in claim 1 including, adjustable means on the front ends of said U shaped member adapted to contact said draw-bars and determine the forward tilting of the scoop.

3. A device as recited in claim 1 including, means on the rear ends of said draw-bars adapted to limit said rearward tilting of said U shaped member.

4. In combination with a tractor, having a power lift, a scoop body, drawbars pivotally connected to the tractor at their front ends and to the side walls of the scoop at their rear ends, a U shaped member paralleling the sides and rear of the scoop, its side members being pivoted intermediate their ends to said scoop pivot to permit limited tilting in either direction of said U shaped member on its pivots, means on the rear ends of said scoop body and U shaped member adapted to engage these members when the scoop is in a loading position and having a connection which extends within reach of the tractor operator whereby when said scoop is in a lifted position said engaging means may be released, arms spaced above said drawbars and being hinged at their front ends to the tractor and having a link connection from their rear ends to the forward ends of said U shaped member, an operating connection from said power lift to said arms intermediate their ends, whereby when said power lifting mechanism is first operated the front end only of the scoop will be lifted and the scoop tilted backwards and whereby a further movement of the power lift will lift the entire scoop.

5. In combination with a tractor, having a power lift, a scoop body, drawbars pivotally connected to the tractor at their front ends and to the side walls of the scoop at their rear ends, supplemental bars spaced a distance above said drawbars and being pivoted at their front ends to the tractor, a U shaped member surrounding the rear and sides of said scoop and being pivoted intermediate its sides to the scoop pivots, links forming connections between the rear ends of said supplemental bars and the front ends of said U shaped member, link connections between said power lift and said supplemental bars, means associated with said draw-bars and U shaped member adapted to limit the tilting movement of the U shaped member, a latch pivoted to the rear end of said scoop and adapted to engage the rear end of said U shaped member when the scoop is in a loading position, and hold the scoop whereby when said supplemental bars are first lifted the scoop will be caused to tilt backward and whereby when the scoop is in a lifted position said latch may be disengaged and the scoop permitted to tilt forward for dumping.

FREDERICK B. ARPS.